US010075617B2

(12) United States Patent
Chandrasekaran

(10) Patent No.: US 10,075,617 B2
(45) Date of Patent: Sep. 11, 2018

(54) SYSTEMS AND METHODS FOR PREVENTING UNAUTHORIZED USAGE AND MOVEMENT OF ELECTRONIC COMPONENTS FROM ONE DEVICE TO ANOTHER DEVICE

(71) Applicant: XEROX CORPORATION, Norwalk, CT (US)

(72) Inventor: Kannan Chandramouli Chandrasekaran, Chennai (IN)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 15/421,684

(22) Filed: Feb. 1, 2017

(65) Prior Publication Data

US 2018/0220044 A1    Aug. 2, 2018

(51) Int. Cl.
| | | |
|---|---|---|
| G06F 21/00 | (2013.01) | |
| B41J 17/36 | (2006.01) | |
| B42D 25/30 | (2014.01) | |
| H04N 1/44 | (2006.01) | |
| H04N 1/00 | (2006.01) | |

(52) U.S. Cl.
CPC ....... H04N 1/4433 (2013.01); H04N 1/00538 (2013.01); H04N 1/4413 (2013.01); H04N 2201/0094 (2013.01)

(58) Field of Classification Search
USPC ................................................ 358/1.1–3.29
See application file for complete search history.

(56) References Cited

U.S. PATENT DOCUMENTS

| | | | |
|---|---|---|---|
| 4,961,088 A | 10/1990 | Gilliland et al. | |
| 5,272,503 A | 12/1993 | LeSueur et al. | |
| 5,318,370 A | 6/1994 | Nehowig | |
| 5,491,540 A | 2/1996 | Hirst | |
| 6,940,613 B1 | 9/2005 | Beard et al. | |
| 2006/0087678 A1* | 4/2006 | Simpson | G06F 21/34 |
| | | | 358/1.15 |
| 2008/0140967 A1* | 6/2008 | Breslau | G06F 21/80 |
| | | | 711/163 |
| 2010/0083365 A1* | 4/2010 | Gurumoorthy | G06F 21/575 |
| | | | 726/16 |
| 2012/0051758 A1* | 3/2012 | Hayakawa | G03G 15/0863 |
| | | | 399/12 |

* cited by examiner

*Primary Examiner* — Marcellus Augustin

(57) ABSTRACT

The present discloses methods and systems for preventing unauthorized usage of an electronic component. The method includes removing an electronic component from a first multi-function device by a user, the electronic component includes a logic device having a security code. The electronic component is received by a second multi-function device, the second multi-function device includes a controller and a user interface. A communication is established between the logic device and the controller of the second multi-function device. The user interface is provided to input the security code associated with the electronic component, for authorizing the usage of the electronic component in the second multi-function device. A security code is received via the user interface. The usage of the electronic component is authorized in the second multi-function device, if the security code input by the user matches with the security code stored in the logic device.

22 Claims, 4 Drawing Sheets

SYSTEMS AND METHODS FOR PREVENTING UNAUTHORIZED USAGE AND MOVEMENT OF ELECTRONIC COMPONENTS FROM ONE DEVICE TO ANOTHER DEVICE

TECHNICAL FIELD

The presently disclosed embodiments are directed to electronic components of a multi-function device, and more particularly to systems and methods for preventing unauthorized usage and movement of electronic components of the multi-function device.

BACKGROUND

Presently, components of one electronic device may be used in another electronic device without any authorization and authentication. For example, if a battery of a user phone has stopped working, and the user has a working battery in another non-usable phone, then he may not buy a new battery, and may replace the non-working battery with the working battery. In another example, if there is very low ink in a printer cartridge, then the user easily may easily replace the low ink cartridge with a working cartridge of another printer. In further example, the user may unplug the processor of his computer from its motherboard and plug the processor into another motherboard. Similarly, a Graphical User Interface (GUI) panel, a motherboard, a hard disk and a battery of a device (such as a printer) may be removed from one printer and inserted into another printer of same or different make/kind. These are just few examples to illustrate how common and widespread, is the practice of interchanging/re-using of components among similar electronic devices. Also, this practice is more prevalent due to similar components being used by electronic devices of multiple brands.

However, the practice of interchanging and re-using components among similar printer devices prevents the user from buying new components. In commercial markets, this practice leads to unauthorized swapping of components from one printer device to another, and further promotes servicing of printer devices by local technicians. This practice also encourages theft of electronic components, where the components of a stolen electronic device may be re-used in other similar devices. It may therefore be advantageous to provide methods and systems for preventing unauthorized usage and movement of electronic components from one device to another device.

SUMMARY

According to embodiments illustrated herein, a method for preventing unauthorized usage and movement of one or more electronic components from one multi-function device to another multi-function device, is disclosed. The method includes removing an electronic component from a first multi-function device by a user, the electronic component includes a logic device having a security code stored therein. Then, the electronic component is received by a second multi-function device, wherein the second multi-function device comprises a controller and a user interface. Thereafter, a communication is established between the logic device of the electronic component and the controller of the second multi-function device. Thereafter, the user interface is provided on the second multi-function device to input the security code associated with the electronic component, for authorizing the usage of the electronic component in the second multi-function device. A security code is received from the user via the user interface of the second multi-function device. Finally, the usage of the electronic component is authorized in the second multi-function device, if the security code input by the user matches with the security code stored in the logic device.

According to embodiments illustrated herein, a method for securing one or more electronic parts of a printer is disclosed, the printer is associated with a unique code. The method includes installing the one or more electronic parts in the printer. Then, a user interface is provided to receive the unique code of the printer. Based on the unique code, the one or more electronic parts of the printer are identified and displayed, each electronic part includes a logic device having a memory. For each electronic part, a security code is received from a user via a user interface. The security code is then written to the logic device of each electronic part of the printer.

The security code is stored in the memory of each electronic part of the printer. Finally, the security code is activated for each electronic part, the security code prevents unauthorized usage and movement of the electronic part from one printer to another printer.

According to further embodiments, a system for preventing unauthorized usage and movement of one or more electronic components from one multi-function device to another multi-function device, is disclosed. The system includes a first multi-function device and a second multi-function device. The first multi-function device includes one or more electronic components, wherein each electronic component includes a logic device having a security code stored therein. The second multi-function device includes a controller. The controller is configured for: detecting an electronic component of the first multi-function device as inserted in the second multi-function device; establishing a communication with the logic device of the electronic component of the first multi-function device; displaying a user interface to input the security code associated with the electronic component for authorizing the usage of the electronic component in the second multi-function device; receiving a security code from the user via the user interface; and authorizing the usage of the electronic component in the second multi-function device, if the security code input by the user matches with the security code stored in the logic device of the electronic component.

According to furthermore embodiments, a printer for protecting one or more electronic components of the printer is disclosed, the printer is associated with a unique code. The printer includes a controller, a user interface and a memory. The user interface is configured for: receiving the unique code of the printer; based on the unique code, identifying and displaying the one or more electronic components of the printer, each electronic component includes a logic device comprising a memory and a logic circuitry; and for each electronic component, receiving a security code as input by a user. The controller is configured for: writing the security code onto a corresponding logic device of each electronic component of the printer, wherein the security code is stored in the memory of each electronic component of the printer; and activating the security code for each electronic component, the security code prevents unauthorized movement of the corresponding component from one printer to another printer. And the memory is configured for storing the security code assigned to each electronic component of the printer.

According to additional embodiments illustrated herein, an electronic component for use in a multi-function device, the electronic component includes a logic device. The logic device includes a memory for storing a security code for re-using the electronic component in another multi-function device, wherein the security code authorizes the use of the electronic component in another multi-function device. And the logic device includes a logic circuitry for interacting with a controller of the multi-function device for performing at least one of: retrieving the security code, activating the security code and modifying the security code.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DESCRIPTION

Figure 1:
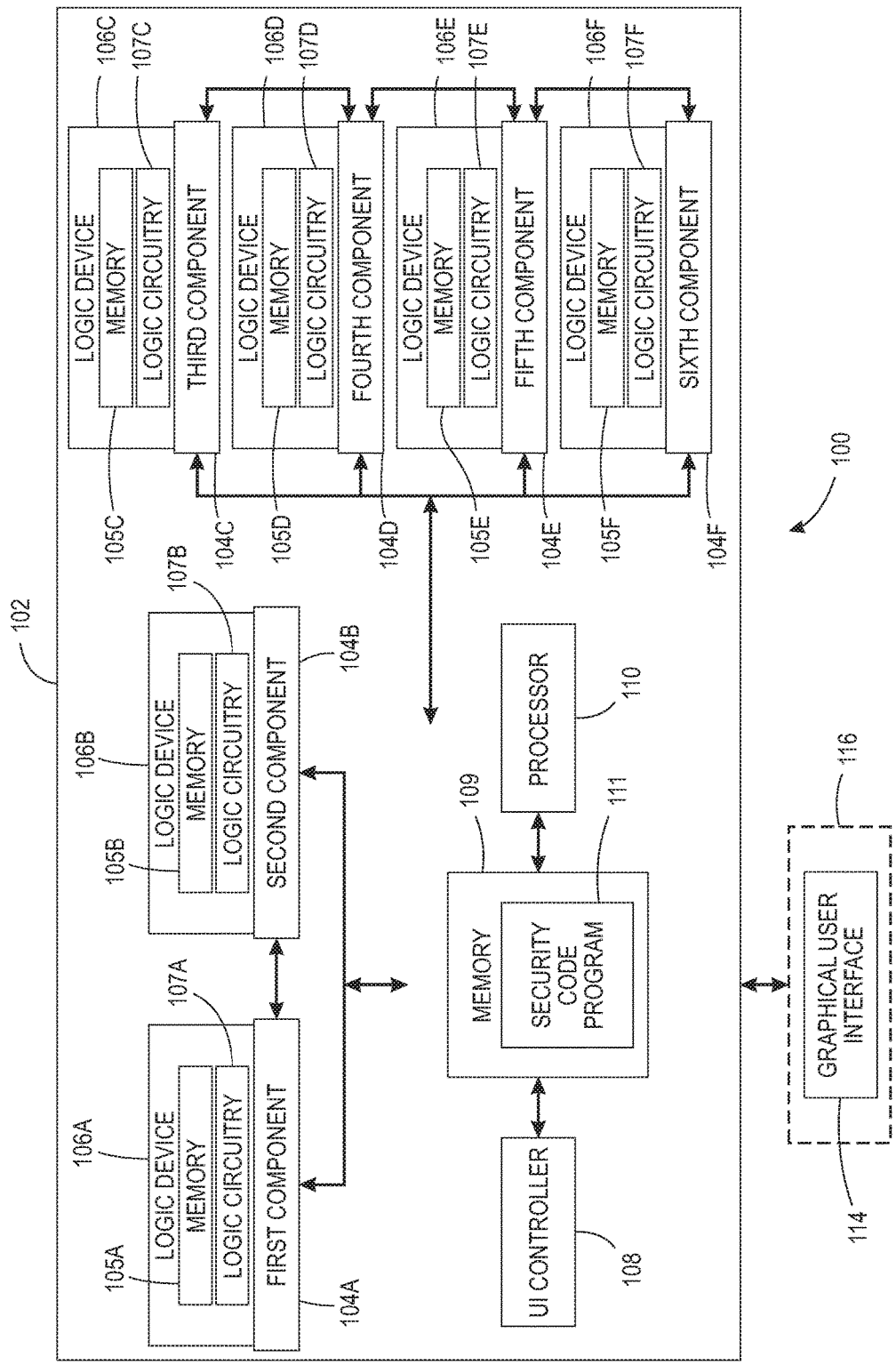
FIG. 1 illustrates an exemplary environment in which various embodiments of the disclosure can be practiced.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

Definitions of one or more terms that will be used in this disclosure are described below without limitations. For a person skilled in the art, it is understood that the definitions are provided just for the sake of clarity, and are intended to include more examples than just provided below.

A "multi-function device" is a single device or a combination of multiple devices configured to perform more than one function such as, but not limited to, scanning, printing, imaging, and so forth. The multi-function device may include software, hardware, firmware, and combination thereof. The multi-function device may interchangeably be used with the phrase "printer," "printer device," "scanner," "a fax machine," or a "copier." In the context of the current disclosure, the multi-function device is configured to assign a security code to electronic components of the multi-function device and to prevent unauthorized usage of the electronic components from one multi-function device to another multi-function device. The multi-function device includes one or more elements such as a memory, a user interface, a controller (or a user interface controller) that will be discussed in detail below. In the context of the current disclosure, the user interface enables the user to input, retrieve, activate and modify one or more security codes of one or more electronic components of the multi-function device. The UI controller provides, controls and manages the user interface of the multi-function device. In particular, the UI controller performs one or more functionalities related to security codes of electronic components of the multi-function device. More details will be discussed below.

An "electronic component" refers to a component that performs one or more functions. Examples of the electronic component include, but are not limited to, a power supply unit, a motherboard, a memory, a battery, a GUI panel, and an input device. In case of a printer, the electronic components include a power cord, a print head, a printer cartridge, a belt and roller, a fuser, a hard drive, an imaging unit, a fan, a control panel, a printer memory, a paper tray, and a feeding assembly.

A "logic device" refers to a device/chip including a memory for storing security codes and a logic circuitry for interacting with the UI controller of the multi-function device to perform a pre-defined operation. For example, storing, retrieving, modifying, validating, and activating security codes.

A "security code" refers to a code containing a word, or a number, or an alphanumeric character. In the context of the present disclosure, the security code prevents unauthorized use and movement of the electronic components from one device to other device, i.e., from one multi-function device to another multi-function device.

A "user" refers to any user who wishes to the use the multi-function device for printing, scanning, etc., and may be aware of a security code associated with each electronic component of the multi-function device. An "admin user" refers to an authorized user who is aware of security code of the electronic components of the multi-function device. The admin user generally installs the electronic components in the multi-function device or re-installs the electronic components in another multi-function device. The admin user may be able to perform one or more functionalities via the user interface of the multi-function device. The admin user may also be referred to as an authorized user or a manufacturer of the multi-function device. The admin user may be interchangbly used with the phrase "user."

A "security code program" refers to a set of instructions stored in a memory of the controller of multi-function device such that the set of instructions are executed. The set of instructions enable the user to perform one or more functions related to the security codes or additional functions related to the electronic components of the multi-function device.

Overview

The following detailed description is provided with reference to the figures. Exemplary, and in some case preferred, embodiments are described to illustrate the disclosure, not to limit its scope, which is defined by the claims. Those of ordinary skill in the art will recognize a number of equivalent variations in the description that follows.

In most existing machines such as printers, electronic components are interchanged and re-used without any authorization and authentication. However, the practice of interchanging and re-using electronic components leads to unauthorized swapping of parts from one printer device to another and promotes servicing of machines/devices by local technicians. This practice also encourages theft of electronic devices, where the electronic components of a theft device may be reused in other similar devices. In light of the above, the disclosure discloses methods and systems for preventing unauthorized usage and movement of electronic components of a device such as a printer, a multi-function device, a mobile phone, a laptop, a computer or the like. Each electronic component of the device is provided with a logic chip/device, wherein each logic chip includes a memory for storing a unique security code, and a logic circuitry to process corresponding security code. An electronic component with a security code can be reused in another printer device only if a user of another printer device is aware of the unique security code of that electronic component.

The key difference of the present disclosure from existing approaches is that the logic chips are added to the electronic components without making any changes to the architecture of the device as a whole (i.e., no new wiring or read/write sensors are required). The logic chips are low-cost memory chips to track the usage of corresponding electronic components by reading and writing information from the device's controller. The logic chips facilitate securing the printer parts, prevent unauthorized swapping of printer parts, and discourage theft of printer goods containing such electronic components. For example, if a user wishes to re-use a stolen electronic component in a new printer, then during installation, the user is asked to provide the security code of the stolen electronic component. The installation is successful only if there is a match between the security code provided by the user, and the security code stored in a memory of the electronic component.

Exemplary Embodiments

FIG. 1 is a block diagram illustrating a system 100 for preventing an unauthorized usage and movement of one or more electronic components of a device 102 such as a printer 102. Examples of the device 102 include, but are not limited to, a printer, a scanner, a multi-function device (MFD), a copier, a multi-function printer (MFP), a mobile phone, a laptop, a computing device or any other electronic device having electronic components, which can be reused. Although, embodiments of the present disclosure are described with reference to a printer, it will be apparent to a person skilled in the art that devices other than the printer may be applicable, without limiting the scope of the disclosure. Also, the disclosure (FIG. 1, FIG. 2, FIG. 3 and FIG. 4) will be discussed considering one electronic component of the device, however it is understood that the disclosure can be implemented for more than one electronic component.

The printer 102 includes one or more electronic components such as 104a, 104b, 104c, 104d, 104e, and 104f (collectively 104), a user interface (UI) controller 108, a memory 109, and a graphical user interface 114. The memory 109 includes a security code program 111. Each element 104, 108, 109, 114 is coupled to each other and communicate via a bus or a communication protocol. As shown, the printer 102 is formed of first through sixth electronic components 104a till 104f. Examples of the electronic components 104 include, but are not limited to, a power supply unit, a printer motherboard, a printer cartridge, a belt and roller, a fuser, a hard drive, an imaging unit, a fan, a control panel, a printer memory, a paper tray and feeding assembly, a power cord, a print head, a battery, a GUI panel, and a print scanner. The electronic components 104 are reusable components and are removable. It will be apparent to a person skilled in the art that further electronic components may be added to the printer 102, without limiting the scope of the disclosure.

As depicted, first through sixth logic devices 106a till 106f (hereinafter collectively referred to as logic devices 106) are attached to the first through sixth electronic components 104a till 104f, respectively. For example, the logic device 106a is coupled to the electronic component 104a, the logic device 106b is coupled to the electronic component 104b, the logic device 106c is coupled to the electronic component 104c, the logic device 106d is coupled to the electronic component 104d, the logic device 106e is coupled to the electronic component 104e, and the logic device 106f is coupled to the electronic component 104f. Each logic device 106 is integrated to the electronic component 104 without modifying the architecture of the printer 102 as a whole (i.e., no new wiring or read/write sensors are required). Each logic device 106 is pre-integrated with the electronic component 104 of the printer 102. Further, each logic device 106 includes a memory 105 for storing a security code, and a logic circuitry 107, for processing the security code. As evident, the logic device 106a includes a memory 105a and a logic circuitry 107a, the logic device 106b includes a memory 105b and a logic circuitry 107b, the logic device 106c includes a memory 105c and a logic circuitry 107c, the logic device 106d includes a memory 105d and a logic circuitry 107d, the logic device 106e includes a memory 105e and a logic circuitry 107e, and the logic device 106f includes a memory 105f and a logic circuitry 107f.

The memory 105 of the electronic component 104 is similar to USB storage or memory card, for storing the security code. In some embodiments, the memory 105 may store other components details such as (serial number, part number, batch number, etc.) to ensure additional security and to interlink the electronic components 104 with each other, i.e., other component information is stored in another component. This interlinking provides additional security benefits and ensures the electronic components 104 belong to the same printer, i.e., the printer 102. The logic circuitry 107 is communicatively coupled to the user interface (UI) controller 108 of the printer 102 such that the logic device 106 reads and writes data from the UI controller 108, the UI controller 108 manages and controls the graphical user interface 114 of the printer 102, and executes a set of instructions to enable the graphical user interface 114 to write a security code, retrieve the security code, modify the security code, activate the security code, display the security code or other functions related to the security code.

The logic device 106 uses the existing circuits which the printer 102 uses for collecting information or otherwise interact with the printer 102. One such example for collecting the information or interacting with the printer 102 is Data Transfer. In another example, a data bus may be introduced in the electronic components 104, which can be connected with the printer motherboard to retrieve and transfer the security code without disturbing the existing architecture. Further, CRUM (Customer replacement unit monitor) technology may be used for collecting data. These are just few examples, other known log collecting architecture may be used to implement the current disclosure.

The memory 109 of the printer 102 stores the security code program 111 that includes a set of instructions which are executable by the processor 110 that facilitates the user to input, modify and retrieve the security code of the electronic component 104 via the graphical user interface 114. The graphical user interface 114 allows the user to create, retrieve and modify the security code for each of the electronic component 104. The security code may be a number, a word or an alphanumeric character. In an embodiment, the security code may be encrypted as well. In some embodiments, a default security code is stored in the memory 105 of logic device 106 of the printer 102. The default security code may be provided by a manufacturer of the printer 102 through a separate communication such as email. The default security code may be based on a combination of a model number, a serial number, a manufacturing date and a manufacturing year of the printer 102. The memory 109 includes a management information base (MIBS). The MIBS is a repository that maintains information about the electronic components 104. For example, for a toner, it may store toner related information such as ink levels, toner error codes and like. If an existing toner gets replaced and connected again after some time, the MIBS may recollect the data from the toner. For example, if an ink level of a re-connected toner is very low, then the graphical user interface 114 may display the ink level and also display a corresponding alert/warning.

The graphical user interface 114 is displayed on a display 116. Examples of the display 116 include, but are not limited to, an LCD display, an LED display, and an OLED display. In an embodiment, the display 116 is integral to the printer 102. In some embodiments, the display 116 is external to the printer 102 such as a display of an external computing device. The external computing device may be either connected locally to the printer 102, or through a communication network (not shown). Examples of the external computing device include, but are not limited to, a smart phone, a personal digital assistant (PDA), a personal computer, and a tablet. The communication network may include wired or wireless network, such as but not limited to, a Local Area Network (LAN), a Wide Area Network (WAN), a Wi-Fi network and so forth.

The graphical user interface 114 generally enables the user to submit and retrieve a print job request, view previous print job requests, provide their print job preferences, etc. The UI controller 108 manages, controls, and stores the data presented and submitted through the graphical user interface 114. In an embodiment, when the admin user inputs or modifies one or more security codes through the graphical user interface 114, they are automatically written onto memories of respective logic devices 106. Further, when the admin user submits a request for retrieving one or more security codes via the graphical user interface 114, they are automatically read from memories of respective logic devices 106 and listed on the graphical user interface 114 against respective electronic component 104.

The UI controller 108 is communicatively coupled to the logic device 106 (specifically to the logic circuitry 107) such that the logic device 106 is configured to read and write information from the UI controller 108. When the user inserts the electronic components 104 for the first time, the UI controller 108 allows the user to input a security code, retrieve the security code, modify the security code, write the security code onto the memory 105 and activate the security code for each electronic component 104. Here, the user can input the security code of his choice or otherwise input the security code. When the user moves an electronic component from one device to another, the UI controller 108 allows other functions such as security code retrieval, validating the security code input by the user with the security code stored within the logic device 106 to authorize the usage of the electronic component in the another device.

The UI controller 108 tracks and stores information regarding the usage of each electronic component 104 of the printer 102 based on the print jobs submitted and completed through the GUI 114. The logic devices 106 are configured to read and write information from the UI controller 108 to track a history and usage of corresponding electronic components 104. For example, based on the total number of print job requests submitted by the user through the graphical user interface 114 within a given time period, a history and usage of a corresponding printer cartridge within the given time period can be determined. This tracked information can be useful in preventing re-using/re-selling of electronic components that have been already used to their full capacity. For example, if a billing information of a toner having a unique security code shows that 1000 copies are printed by the toner, and the toner is eligible to print another 1000 copies, but based on the information provided by the U I controller 108, it is determined that the toner with the given security code is being already used for printing 2000 copies, then reselling of such toner can be discouraged, and the user need not pay for an electronic component that has already been used to its full capacity.

Figure 2:
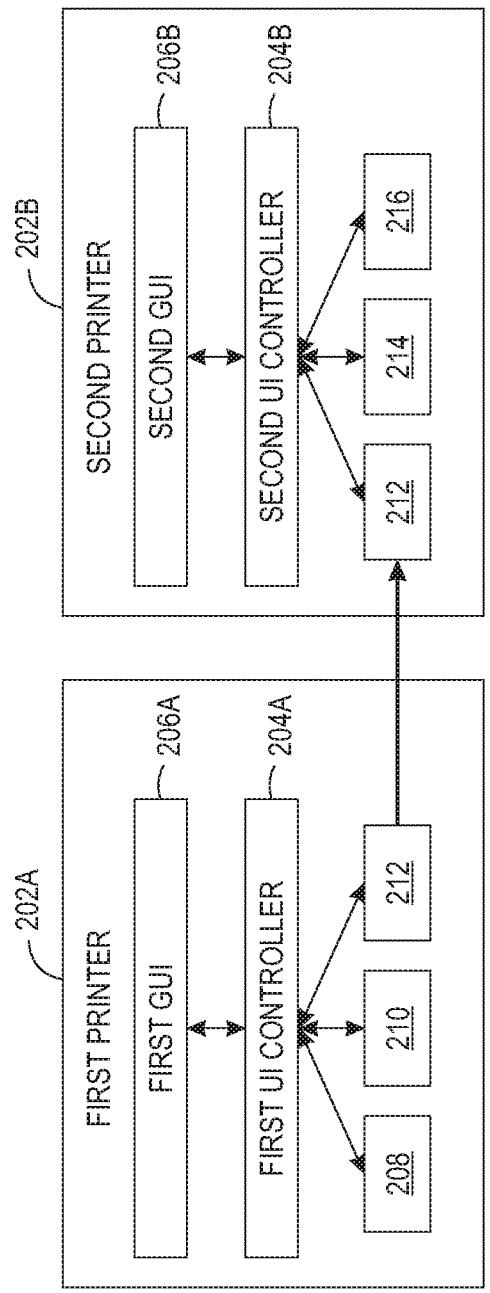
FIG. 2 is an exemplary block diagram illustrating an electronic component of a first printer being installed into a second printer, in accordance with an embodiment.

FIG. 2 is a block diagram illustrating two devices such as a first printer 202a, and a second printer 202b. The first printer 202a and second printer 202b may be of similar kind. The embodiment of FIG. 2 shows an electronic component of the first printer 202a being installed in the second printer 202b. As shown, the first printer 202a includes a first graphical user interface (GUI) 206a, a first user interface (UI) controller 204a and one or more electronic components 208, 210 and 212. Each element of the first printer 202a is connected to each other and communicate via a bus or other communication protocol. Similarly, the second printer 202b includes a second graphical user interface (GUI) 206b, a first user interface (UI) controller 204b and one or more electronic components 214 and 216. Each element of the printer 202b is connected to each other and communicate via a bus or other communication protocols.

The first UI controller 204a provides, controls and manages the first GUI 206a on a corresponding display. The first UI controller 204a executes a security code program to enable an admin user to assign, modify, activate, or validate unique security codes related to corresponding printer components 208, 210 and 212 via the first GUI 206a. Similarly, the second UI controller 204b provides, controls and manages the second GUI 206b on a corresponding display and executes a similar security code program to enable the user to assign, modify, activate, or validate unique security codes related to corresponding printer components 214 and 216.

Here, the user removes the component 212 from the first printer 202a and wishes to install/insert the removed component 212 in the second printer 202b. The second printer 202b receives the component 212 and a communication is established between the logic device of the electronic component 212 and the second UI controller 204b of the second printer 202b. Upon the installation of the component 212 in the second printer 202b, the second GUI 206b is configured to prompt the user to enter the security code of the printer component 212. The user inputs a security code via the second GUI 206b. The second UI controller 204b, i.e., the UI controller of the second printer 202b checks the input security code with the security code stored in the component 212. If there is a mismatch between the security code input by the user and the security code stored in the component 212, then the component 212 cannot be re-used in the second printer 202b. In such cases, the second UI controller 204b de-authorizes the re-use of the component 212 in the second printer 202b. And the second UI controller 204b deactivates the usage of the component 212 in the second printer 202b. But if the security code input by the user matches with the security code stored in the component 212, then the second UI controller 204*b* authorizes and allows the use of the component 212 in the second printer 202*b*. In this manner, the present disclosure allows re-use of the electronic components upon proper authorization using a security code. And further the disclosure only allows an authorized user who is aware of security code to freely interchange and replace one or more components such as 212 among the first and second printers 202*a* and 202*b*.

If the number of attempts exceed a pre-defined threshold, then the second UI controller 204*b* deactivates the usage of the component 212 in the second printer 202*b*. In case of unsuccessful match, the second UI controller 204*b* generates an alert or alarm for the admin user. The admin may be the vendor, the manufacturer of the device or any other authorized user.

Figure 3:
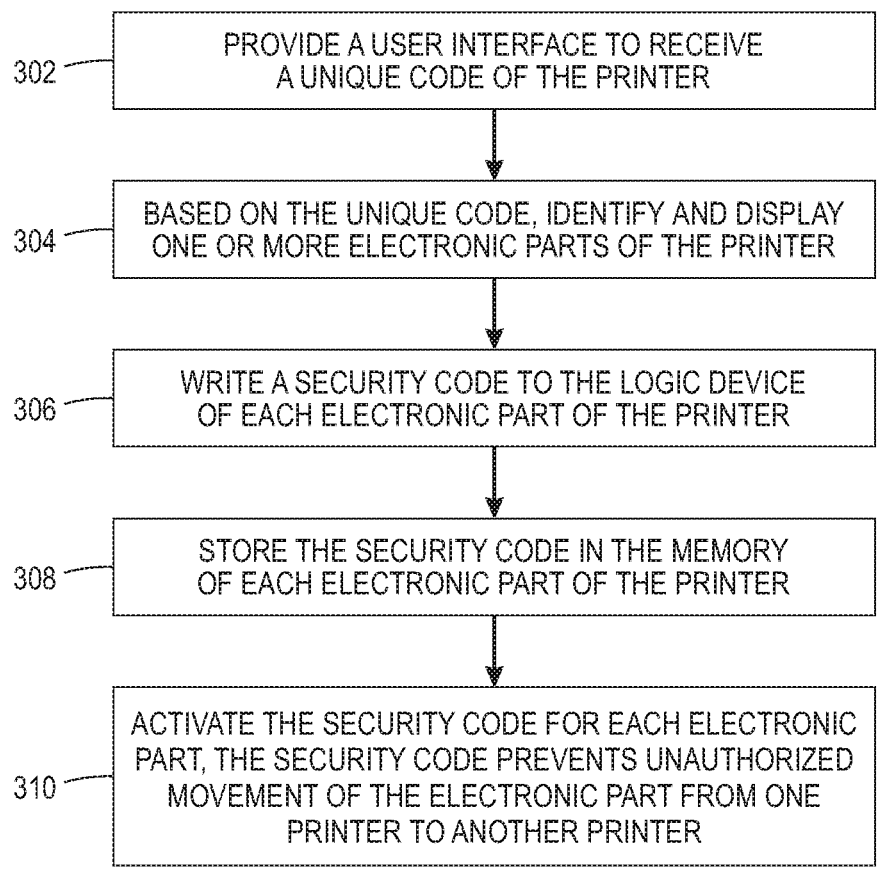
FIG. 3 is a flowchart illustrating a method for assigning security codes to electronic components of a printer, in accordance with an embodiment.

FIG. 3 is a flowchart illustrating a method of securing one or more electronic parts of a printer. This is achieved by assigning security codes to each electronic part of the printer. The assigned security code is required when a user removes an electronic part from a printer and wishes to re-use in another printer. In this manner, the security code prevents the electronic part being re-used from one printer to another printer. Further, the printer itself is also associated with a unique code of the printer. The method is depicted as a collection of steps in a logical flow diagram, which represents a sequence of steps that can be implemented in hardware, software, or a combination thereof.

Initially, a user inserts one or more electronic parts in a printer. Upon insertion, the user is provided with a user interface of the printer to access one or more electronic parts of the printer. The user provides the unique code of the printer if known to the user. The unique code of the printer is received at 302. Based on the unique code of the printer, at 304, the one or more electronic parts of the printer are identified and displayed to the user. The electronic parts are displayed via the user interface of the printer. Each electronic part includes a logic device having a memory and a logic circuitry. Then, the user provides a security code to each electronic part of the printer via the user interface. The security code may be a code of user choice, may be based on the unique code of the printer or a combination thereof. The user may assign a default security code, i.e., code of the printer or may assign a new security code as well.

After this, the security code is written to the logic device of each electronic part of the printer at 306. In particular, the security code is written onto the memory of each electronic part and the security code is stored in the memory of each electronic part of the printer at 308. Finally, at 310, the security code is activated for each electronic part, the security code prevents unauthorized movement of the electronic part from one printer to another printer.

For better understanding, an example is considered where a new printer cartridge is installed in a printer. When the new printer cartridge is inserted, the user is provided with a user interface to assign a security code so that only cartridge can be used in other printers only upon authorization, i.e., by users who know the security code of the cartridge. The security code assignment method process is discussed above in detail.

Figure 4:
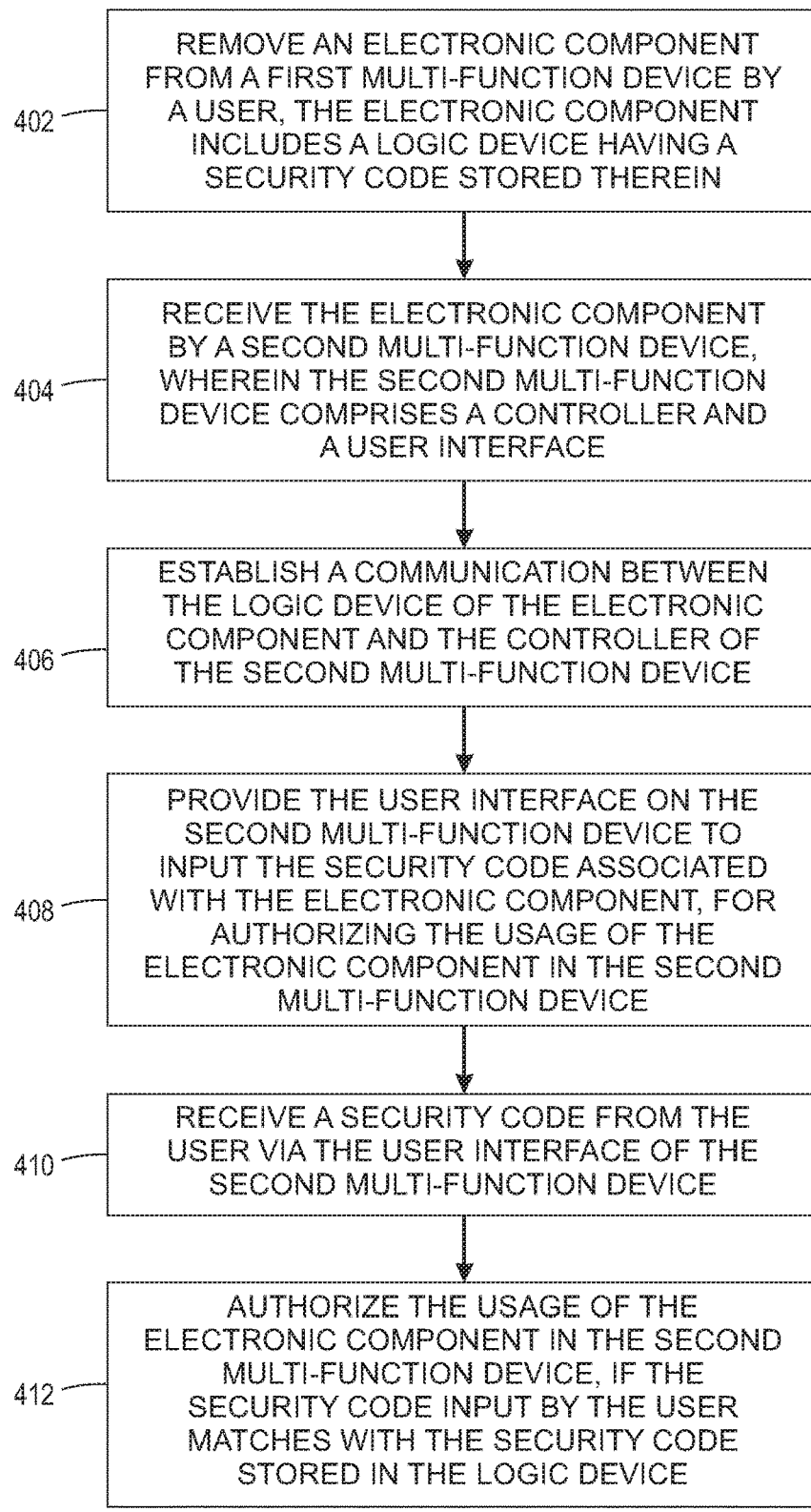
FIG. 4 is a flowchart illustrating a method for preventing unauthorized usage and movement of an electronic component from one device to another device.

FIG. 4 is a flowchart illustrating a method for preventing unauthorized re-use of an electronic component in another device, in accordance with an embodiment. Specifically, a method for preventing unauthorized usage and movement of one or more electronic components from one multi-function device to another multi-function device is disclosed. The method is depicted as a collection of steps in a logical flow diagram, which represents a sequence of steps that can be implemented in hardware, software, or a combination thereof.

The method starts when a user wishes to use an electronic component of one device in another device. Various examples of the device may include a printer, a multi-function device, a scanner, a mobile phone, a laptop, a computing device or the like. At 402, an electronic component is removed from a first multi-function device by a user, the electronic component includes a logic device having a security code stored therein. The user then inserts the electronic component in a second multi-function device. At 404, the electronic component is received by the second multi-function device, wherein the second multi-function device includes a controller and a user interface. Thereafter, at 406, a communication is established between the logic device of the electronic component and the controller of the second multi-function device for data transfer or data retrieval. It is then checked for a security code availability for the electronic component. If the security code option for the component is enabled, the method moves to the block 408, else the method proceed in a conventional way.

Thereafter, the user interface is provided on the second multi-function device to input the security code associated with the electronic component, for authorizing the usage of the electronic component in the second multi-function device at 408. A security code is received from the user via the user interface of the second multi-function device at 410. Finally, at 412, the usage of the electronic component is authorized in the second multi-function device, if the security code input by the user matches with the security code stored in the logic device. If there is a mismatch, then the installation of the component in the second multi-function device is termed as unsuccessful. In such cases, an alert is generated to notify the unauthorized usage of electronic component in the second multi-function device.

If there is no mismatch, then the installation of the used component in the second multi-function device is termed as successful. The used component is accepted by the second multi-function device and can be re-used therein. Therefore, the present disclosure discloses a scheme where only an authorized user who is aware of security code can re-use and replace the used component in other similar multi-function devices or printers.

In some embodiments, the method includes tracking a usage history of the electronic component by reading all the information stored in logic device of the electronic component. Along with the security code, the logic device stores all details related to successful and unsuccessful attempts of using the electronic component.

In some embodiments, the electronic components are provided with default security code as provided by the manufacturer. When the electronic components are inserted in the printer for the first time and the printer is powered on, a pop up message is displayed via the graphical user interface stating that the components are configured with default security code and if the user wishes to modify the security code, disable the security code or continue with the default code.

The present disclosure discloses methods and systems for preventing unauthorized usage and movement of electronic components from one machine to another machines (e.g., printers), thereby discouraging theft of electronic components. Each electronic component contains a security code, the security code prevents the stolen component from being reused as a replacement of a similar component. In this manner, the disclosure secures electronic components and prevents unauthorized swapping of electronic components. The disclosure provides the ability to alert a vendor or user when electronic components are changed. The disclosure adds other benefits such as, avoiding service by local printer/device technicians, grey market/black market protection for components, better inventory control of spare components. In addition, implementation of the current disclosure does not require any changes to the architecture of the existing devices (i.e., no new wiring or read/write sensors are required), thus is cost effective.

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "generating," or "monitoring," or "displaying," or "tracking," or "identifying," "or receiving," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for preventing unauthorized usage and movement of one or more electronic components from a first multi-function device to a second multi-function device, the method comprising:
   removing an electronic component from the first multi-function device by a user, the electronic component includes a logic device, coupled to the electronic component, having a security code stored therein;
   receiving the electronic component by the second multi-function device, wherein the second multi-function device comprises a controller and a user interface;
   detecting, by the controller of the second multi-function device, insertion of the electronic component of the first multi-function device in the second multi-function device;
   in response to the detection, establishing, by the controller of the second multi-function device, a communication with the logic device of the electronic component, wherein the logic device includes a memory to store the security code that enables usage of the electronic component, and a logic circuitry to interact with the controller of the second multi-function device to validate the security code;
   configuring, by the controller of the second multi-function device, the user interface of the second multi-function device to prompt a user to input the security code to authorize the usage of the electronic component in the second multi-function device;
   receiving, by the controller of the second multi-function device, an input security code from the user via the user interface of the second multi-function device; and
   authorizing, by the controller of the second multi-function device, the usage of the electronic component in the second multi-function device, in response to validating that the input security code received via the user interface matches with the security code stored in the logic device,
   wherein authorizing the usage of the electronic component, in response to validation of the security code, which is stored in the logic device coupled to the electronic component, by the controller of the second multi-function device, facilitates secured usage of the electronic component without modifying architecture of the electronic component.

2. The method of claim 1, further comprising generating an alert for an admin user to notify the unauthorized usage, when the input security code mismatches with the security code stored in the logic device of the electronic component.

3. The method of claim 1, further comprising allowing the usage of the electronic component in the second multi-function device, if the input security code matches with the security code stored in the logic device of the electronic component.

4. The method of claim 1, further comprising checking for availability of the security code for the electronic component, when the electronic component is inserted in the second multi-function device.

5. The method of claim 1, further comprising deactivating the electronic component when the input security code mismatches with the security code stored in the logic device of the electronic component.

6. The method of claim 1, further comprising deactivating the electronic component if mismatch attempts exceed a pre-defined threshold.

7. The method of claim 1, wherein the electronic component includes at least one of: a power supply unit, a motherboard, a display, a keyboard, a mouse, a cartridge, a belt and roller, a fuser, a hard drive, an imaging unit, a fan, a control panel, memory, a paper tray and feeding assembly, a power cord, a battery, and a Graphical User Interface (GUI) panel.

8. A method for securing one or more electronic parts of a printer, wherein the printer is associated with a unique code, the method comprising:
   installing the one or more electronic parts in the printer;
   providing a user interface to receive the unique code of the printer;
   based on the unique code, identifying and displaying the one or more electronic parts of the printer, wherein each electronic part includes a logic device, coupled to the electronic part, comprising a memory and a logic circuitry to interact with a controller of the printer in which the electronic part is installed;
   for each electronic part, receiving a security code from a user via the user interface;
   writing the security code to the memory of the logic device coupled to each electronic part of the printer; and
   activating, by the controller of the printer by interacting with the logic circuitry of the logic device, the security code for each electronic part,
   wherein writing the security code to the memory of the logic device coupled to the electronic part, and activating the security code prevents unauthorized usage and movement of the electronic part to another printer, and enhances security of the electronic part without modifying architecture of the electronic part.

9. The method of claim 8, wherein the security code is a default security code.

10. The method of claim 8, wherein the security code is a newly created security code.

11. The method of claim 8, wherein the security code is encrypted.

12. The method of claim 8, further comprising modifying the security code of each electronic part through the user interface of the printer.

13. The method of claim 8, further comprising enabling a security code option for each electronic part of the printer.

14. The method of claim 8, further comprising retrieving the security code associated with each electronic part of the printer.

15. A system for preventing unauthorized usage and movement of one or more electronic components from one multi-function device to another multi-function device, the system comprising:
   a first multi-function device comprising one or more electronic components, wherein each electronic component includes a logic device, coupled to the electronic component, having a memory to store a security code associated with the electronic component, and a logic circuitry to enable validation of the security code; and
   a second multi-function device having a controller configured to:
      detect an electronic component of the first multi-function device as inserted in the second multi-function device;

in response to the detection, establish a communication with the logic device coupled to the electronic component of the first multi-function device;
configure a user interface, of the second multi-function device, to prompt a user to input the security code associated with the electronic component to authorize the usage of the electronic component in the second multi-function device;
receive an input security code from the user via the user interface; and
authorize the usage of the electronic component in the second multi-function device, in response to validating that the input security code matches with the security code stored in the logic device of the electronic component,
wherein authorization of the usage of the electronic component in response to validation of the security code, which is stored in the logic device coupled to the electronic component, by the controller of the second multi-function device, facilitates secured usage of the electronic component without modification in architecture of the electronic component.

16. The system of claim 15, wherein the electronic component includes at least one of: a power supply unit, a motherboard, a display, a keyboard, a mouse, a printer cartridge, a belt and roller, a fuser, a hard drive, an imaging unit, a fan, a control panel, a memory, a paper tray and feeding assembly, a power cord, a print head, a battery, and a Graphical User Interface (GUI) panel.

17. The system of claim 15, wherein the controller is further configured to generate an alert for an admin user to notify the unauthorized usage, when the input security code mismatches with the security code stored in the logic device of the electronic component.

18. The system of claim 15, wherein the controller is further configured to deactivate the usage of the electronic component in the second multi-function device, when the input security code mismatches with the security code stored in the logic device of the electronic component.

19. A printer for protecting one or more electronic components of the printer, wherein the printer is associated with a unique code, the printer comprising:
a user interface configured to:
  receive the unique code of the printer;
  based on the unique code, identify and display the one or more electronic components of the printer, wherein each electronic component includes a logic device, coupled to the electronic component, comprising a memory to store a security code associated with the electronic component, and a logic circuitry to enable validation of the security code; and
  for each electronic component, receive an input security code as inputted by a user;
a controller configured to:
  write the security code to a memory of a corresponding logic device coupled to each electronic component of the printer, and
  activate, by interacting with the logic circuitry of the corresponding logic device, the security code for each electronic component,
  wherein the security code written to the memory of the logic device coupled to the electronic component, and activated by the controller of the printer prevents unauthorized movement of the corresponding electronic component to another printer, and enhances security of the corresponding electronic component without modification in architecture of the corresponding electronic component; and
a memory configured to:
  store the security code associated with each electronic component of the printer.

20. The printer of claim 19, wherein the security code associated with each electronic component is modified.

21. An electronic component for use in a multi-function device, the electronic component comprises:
a logic device, comprising:
  a memory for storing a security code for re-use of the electronic component in another multi-function device, wherein the security code authorizes the use of the electronic component in the another multi-function device; and
  a logic circuitry for interacting with a controller of the multi-function device for performing at least one of: retrieving the security code, activating the security code, and modifying the security code, track a history and usage of the electronic component, and provide information about the history and usage of electronic component to the controller of the multi-function device,
wherein the stored security code in the memory of the logic device enhances security of the electronic component without modifying architecture of the electronic component, and the tracked history and usage of the electronic component optimizes usage of the electronic component by preventing over-use of the electronic component.

22. The electronic component of claim 21, wherein the electronic component is a removable electronic component.

* * * * *